(12) United States Patent
Lakkis

(10) Patent No.: US 8,576,893 B2
(45) Date of Patent: Nov. 5, 2013

(54) SYSTEMS AND METHODS FOR HIGH DATA RATE ULTRA WIDEBAND COMMUNICATION

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 814 days.

(21) Appl. No.: 12/578,102

(22) Filed: Oct. 13, 2009

(65) Prior Publication Data

US 2010/0027587 A1     Feb. 4, 2010

Related U.S. Application Data

(62) Division of application No. 11/458,898, filed on Jul. 20, 2006.

(60) Provisional application No. 60/700,766, filed on Jul. 20, 2005.

(51) Int. Cl.
*H04B 1/69*     (2011.01)
*H04B 1/707*    (2011.01)
*H04B 1/713*    (2011.01)

(52) U.S. Cl.
USPC ........... 375/141; 375/140; 375/146; 375/279; 375/308; 370/335; 370/342; 370/441

(58) Field of Classification Search
USPC ......... 375/140, 146, 141, 279, 308; 370/335, 370/342, 441
See application file for complete search history.

(56) References Cited

U.S. PATENT DOCUMENTS

| | | | |
|---|---|---|---|
| 4,242,705 A | 12/1980 | Ebihara | |
| 5,353,352 A * | 10/1994 | Dent et al. | 380/37 |
| 5,436,973 A * | 7/1995 | Amoroso | 380/46 |
| 5,815,488 A | 9/1998 | Williams et al. | |
| 6,396,868 B1 * | 5/2002 | Yoon et al. | 375/146 |
| 6,717,977 B1 | 4/2004 | Lee | |
| 7,031,371 B1 * | 4/2006 | Lakkis | 375/146 |
| 7,031,739 B1 * | 4/2006 | Imura | 455/522 |
| 7,483,483 B2 * | 1/2009 | Lakkis | 375/238 |
| 7,738,545 B2 * | 6/2010 | Giannakis et al. | 375/229 |
| 7,756,002 B2 * | 7/2010 | Batra et al. | 370/208 |
| 8,169,890 B2 * | 5/2012 | Lakkis | 370/209 |
| 2002/0075943 A1 * | 6/2002 | Kurihara | 375/146 |
| 2003/0012160 A1 * | 1/2003 | Webster et al. | 370/335 |
| 2004/0198260 A1 * | 10/2004 | Molisch et al. | 455/114.1 |
| 2004/0247038 A1 | 12/2004 | Uesugi et al. | |
| 2005/0099881 A1 | 5/2005 | Yamazaki | |
| 2005/0220175 A1 | 10/2005 | Zhou | |
| 2005/0281318 A1 | 12/2005 | Neugebauer | |
| 2006/0282263 A1 * | 12/2006 | Vos et al. | 704/223 |
| 2007/0019710 A1 | 1/2007 | Lakkis | |
| 2008/0310545 A1 * | 12/2008 | Webster et al. | 375/295 |

OTHER PUBLICATIONS

International Search Report—PCT/US06/028176, International Search Authority—US, Sep. 25, 2007.

(Continued)

*Primary Examiner* — Phuong Phu
(74) *Attorney, Agent, or Firm* — Dang M. Vo

(57) ABSTRACT

A high data rate UWB system implements a frame structure that uses a connected set of m-sequences comprising the lowest possible cross-correlation and perfect, or near perfect autocorrelation. Each m-sequence can be used to identify a different piconet A very efficient code matched filter can then be used to decode the frames and achieve synchronization with a piconets.

16 Claims, 9 Drawing Sheets

(56) References Cited

OTHER PUBLICATIONS

Written Opinion—PCT/US06/028176, International Search Authority—US, Sep. 25, 2007.

International Preliminary Report on Patentability—PCT/US06/028176, The International Bureau of WIPO—Geneva, Switzerland, Jan. 22, 2008.

Anatol Z. Tirkel, "Cross-Correletio of M-Sequences—Some Unusual Coincidences", Sep. 1996. IEEE, vol. 3, pp. 969-973.

\* cited by examiner

SYSTEMS AND METHODS FOR HIGH DATA RATE ULTRA WIDEBAND COMMUNICATION

RELATED APPLICATION INFORMATION

This application is a Divisional of U.S. patent application Ser. No. 11/458,898, entitled "SYSTEMS AND METHOD FOR HIGH DATA RATE ULTRA WIDEBAND COMMUNICATION," filed Jul. 20, 2006, which claims priority under 35 U.S.C. 119(e) to U.S. Provisional Application Ser. No. 60/700,766 entitled "Systems and Methods for High Data Rate Ultra Wideband Communications," filed Jul. 20, 2005, which is incorporated herein by reference in its entirety as if set forth in full.

BACKGROUND

1. Field of the Invention

The embodiments described herein are related to Ultra Wideband communication systems, and more particularly to efficient communication with reduced processing overhead in a Ultra Wideband communication system.

2. Background

FIG. 1 is a diagram illustrating an exemplary frame structure 102 used in Ultra Wide Band (UWB) communication systems. As can be seen, frame 102 comprises a preamble 104 separated from a packet payload, or data portion 108 by a header 106. Preamble 104 can comprise a packet sync sequence (SYNC) 110, a start frame delimiter (SFD) 112, and a channel estimation sequence (CE) 114. In many conventional systems, SYNC 110 is comprised of a plurality of codes 116. SYNC 110 is used to detect the beginning frame 102 and allows a device to lock to a specific piconet. Each piconet uses a different code 116 for SYNC 110. SFD 112 is used to indicate the end of SYNC 110 and CE 114 is used to estimate multi-path fading for the channel being received. SFD 112 also comprises of plurality of codes 118. CE 114 also comprises a plurality of codes 120.

Thus, in a UWB system a piconet could be configured to transmit data 108 within frame structures 102. UWB devices operating in range of the piconet can then be configured to receive packets 102 from the piconet and synchronize their receivers to the transmitter in the piconet by detecting and correlating SYNC 110 within frame 102. Because the device has no knowledge or where within SYNC 110 it begins receiving frame 102, SFD 112 can be included in order to indicate that the end of SYNC 110 is being received. Accordingly, when SFD 112 is detected by the receiver, the receiver can be configured to stop trying to synchronize itself with the transmitter and, if synchronization is achieved, prepare to receive data 108. CE 114 can be used by the receiver to estimate the effects of multi-path fading for the received signal.

The receiver front-end manipulates the received data and converts it to a digital signal that can be passed to a digital back-end within the receiver. This digital back-end can comprise the components necessary to determine, for example, whether the receiver is synchronized with the transmitter. FIG. 2 is a diagram illustrating an exemplary portion 200 of a digital back-end receiver configured to determine whether or not the receiver is synchronized with the transmitter in the piconet. Receiver portion 200 can comprise a code match filter 202, which can be configured to perform a coherent filtering, e.g., de-spreading, of the received signal. The coherent filtering, or dc-spreading process typically results in a processing gain being applied to the received signal at the output of code match filter 202.

The processing gain can be approximately equal to the number of chips included in code 116. Thus, for example, if code 116 comprises 127 chips, then a processing gain of 127 can be achieved by code match filter 202.

The output of code match filter 202 is then passed to a squarer 204, which can be configured to take the power of the signal at the output of code match filter 202 and perform a squaring operation. The output of squarer 204 can then be passed to accumulator 206, which can be configured in non-coherently accumulate the power of the output of square root 204.

The output of accumulator 206 can then be passed to a decision block 208, which can be configured to compare the accumulator output to a threshold and decide whether the piconet signal is in fact present. If the receiver is sufficiently synchronized with the piconet, then the power at the output of accumulator should be sufficient to surpass the threshold indicating that the piconet signal is in fact present. If signals from the piconet are not being received, or if the receiver is not synchronized with the transmitter in the piconet, then the power at the output of accumulator 206 should not be sufficient to surpass the threshold and decision block 208 should indicate that the piconet signal is not present.

FIG. 3 is a diagram illustrating an exemplary code match filter 202 that is often used in conventional receiver portions 200. Such a conventional code match filter 202 typically comprises a plurality of filter taps 302, e.g., 127 filter taps 302 for a code 116 comprising 127 chips. Filter taps 302 are separated by delay blocks 304 and are coupled with the inputs of multipliers 306, which can be configured to multiply the tap input by a coefficient, as is well known. The output of multipliers 306 can then be provided to an adder tree 308 where the outputs are combined into a single signal.

Such conventional code match filter designs suffer from several problems that can limit efficiency and over-all performance. For example, one challenge presented by such a conventional code match filter design is that the circuit has to run at a very high speed approximately equal to the bandwidth of the system. As is understood, UWB systems have extremely wide bandwidths, e.g., 1.5 GHz. Thus, code match filter 202 must be configured to run at a speed of approximately 1.5 GHz. This presents many design problems. One problem is that the circuits included in code match filter 202 can have difficulty running at such high speeds. Further, operation at such high speeds can present increase error tolerances, and consume much larger amounts of current. Another problem with such a conventional code match filter 202 is that it tends to be highly complex. For example, adder tree 308 requires many sub-adders, e.g. as many as 126-sub adders for a code 116 of length 127. This increased complexity increases error tolerances, increases the area required to implement the code match filter, and can also increase current consumption.

It will also be understood that at least in the United States, UWB systems are configured to operate in what is referred to as the unlicensed spectral band. Because many systems, including many government and safety systems, operate in the unlicensed band, the Federal Communications Commission (FCC) regulates the transmit power for devices operating in the unlicensed band. The regulations in some respects attempt to limit the peak output power. It will be understood that limiting the peak output power will also limit the transmit range of a device. It will also be understood that it is often preferable maximize the transmit range for effective and efficient communication. Accordingly, the FCC's regulations can be at odds with performance objectives.

It will be understood that it can be preferable to have a flat transmit spectrum. A flat transmit spectrum allows for the maximum transmit power even in the face of the FCC's regulations. It will also be understood that the above issues can limit the effectiveness and efficiency of conventional UWB receiver designs and prevent them from meeting the requirements of the specific implementation, e.g., in terms of battery life and size.

SUMMARY

A high data rate UWB system implements a frame structure that uses a connected set of m-sequences comprising the lowest possible cross-correlation and perfect, or near perfect autocorrelation. Each m-sequence can be used to identify a different piconet A very efficient code matched filter can then be used to decode the frames and achieve synchronization with a piconets.

In one aspect, the m-sequences can be 127 chips in length.

In another aspect, different codes can be used to spread data being transmitted in order to achieve different operational data rates.

In still another embodiment, the spreading codes can be selected and implemented in such a manner as to achieve a flat, or nearly flat transmit spectrum.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Certain embodiments described below are directed to high data rate UWB systems comprising a plurality of piconets. As will be understood, the piconets comprise a Service Access Point (SAP) that is configured to communicate with remote communication devices and allow access to the system in much the same way that base stations communicate with devices and allow access to the network in a cellular communication system. One or more of the piconets can have overlapping boundaries and each can use the same spectrum for communication. Accordingly, remote communication devices operating within the system should be capable of identifying and synchronizing with a particular piconets. Further, the system should be designed such that adjacent piconets do not interfere with each other. It can also be preferable for the system to be designed so as to maintain the maximum possible output power in order to increase the range.

For example, the UWB system can comprise a network range for each piconets of 25 meters with a network bandwidth of approximately 1.5 GHz. The chip rate for the system can then be defined as l/bandwidth, which is equal to 0.666 ns. Data to be communicated on the downlink. i.e., form the piconets or SAP to the remote device, can then be organized into frames. The frames can use certain codes or sequences to allow a remote device to synchronize with the respective piconets. The codes will comprise a certain number of chips. As explained below each chip can represent one or more bits of information. The codes used for synchronization should be sufficient to allow a remote device to synchronize with the piconets even in the face of multipath. Accordingly, the code length should be defined as:

$\Delta t = \Delta r/c$, where $\Delta t$=the delay spread,
$\Delta r$=the distance between the first and last multipath, and
c=the speed of light.

Using the example parameters provided above, $\Delta r$ is equal to 25 meters, which provides a delay spread ($\Delta t$) of 83 ns or 127 chips. Thus, the code length should be 127 chips. It will be understood that the parameters provided are by way of example only and that other parameters can be used in accordance with the systems and methods described herein.

It will be further understood that the term remote device refers to a device that is remote form the SAP. Such a remote device can be a mobile or fixed device.

Figure 1:
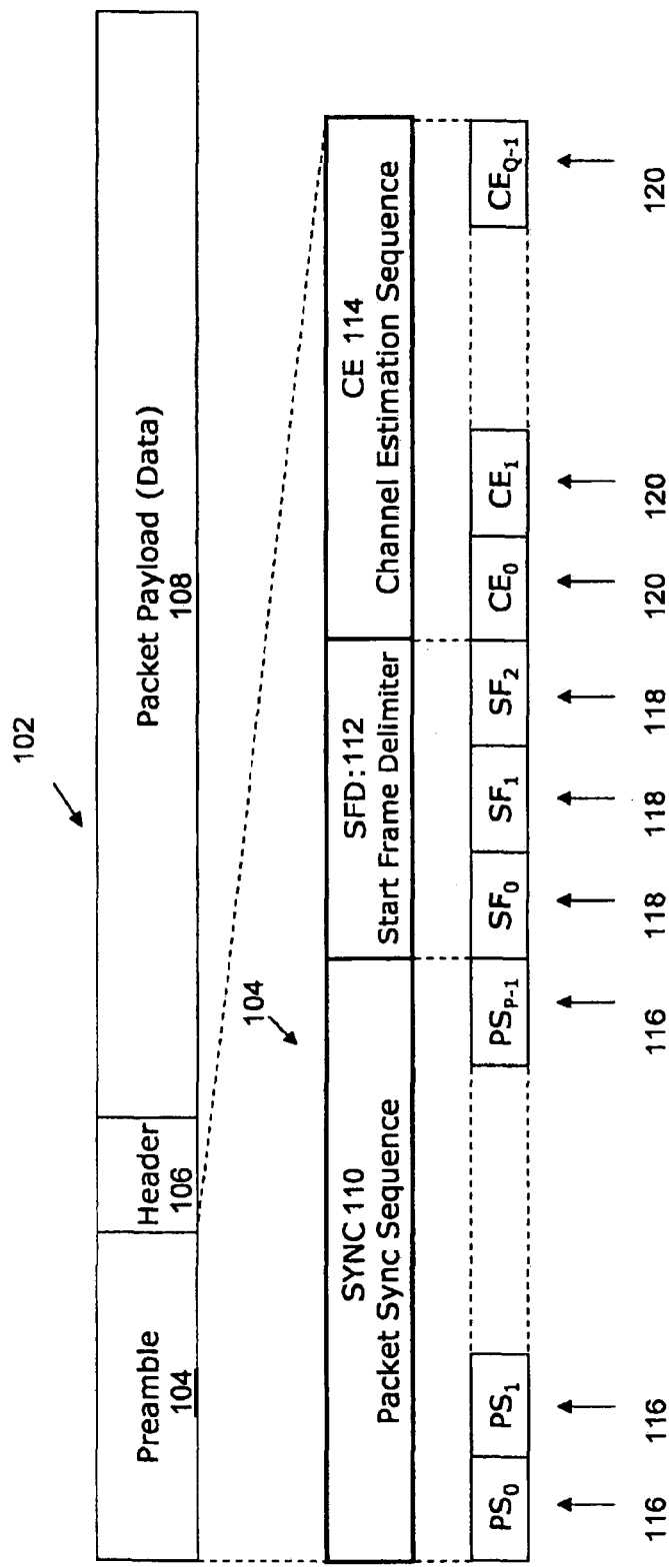
FIG. 1 is a diagram illustrating an exemplary frame structure for use in a conventional UWB system.
Figure 2:
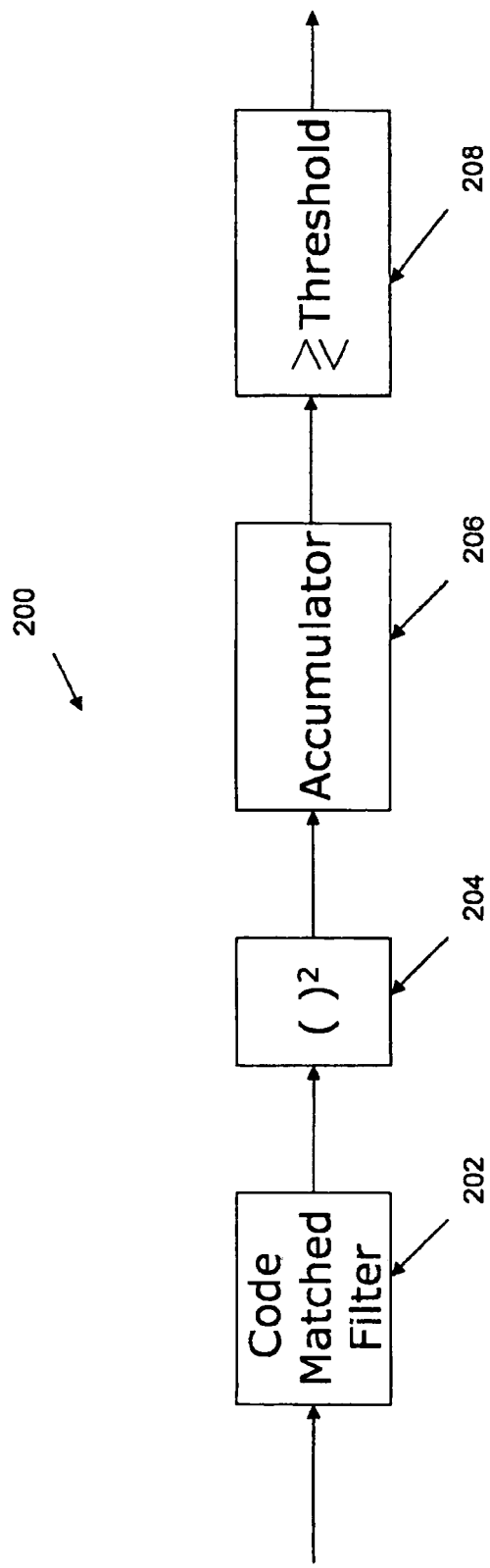
FIG. 2 is a diagram illustrating a portion of a receiver used in a conventional UWB system.
Figure 3:
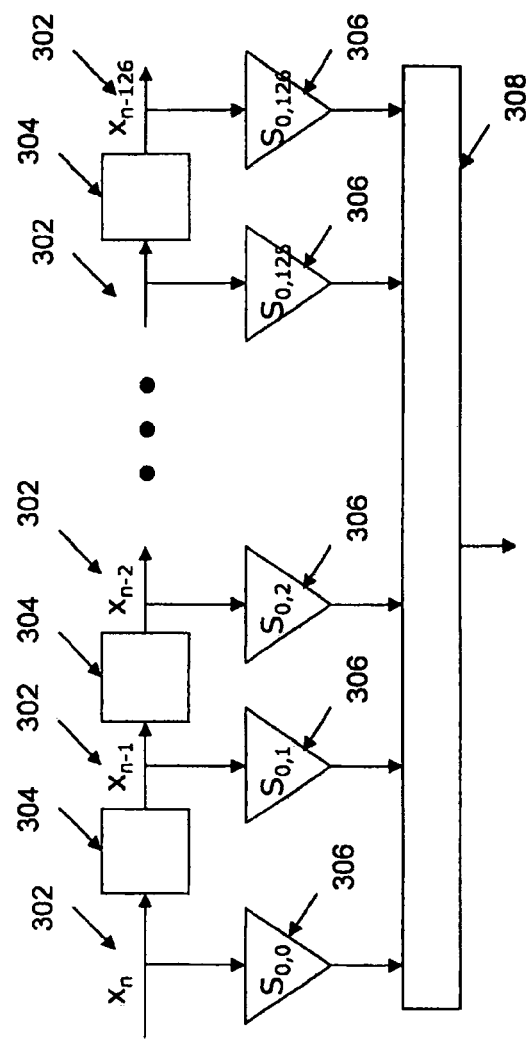
FIG. 3 is a diagram illustrating an exemplary code matched filter used in the receiver of FIG. 2.
Figure 4:
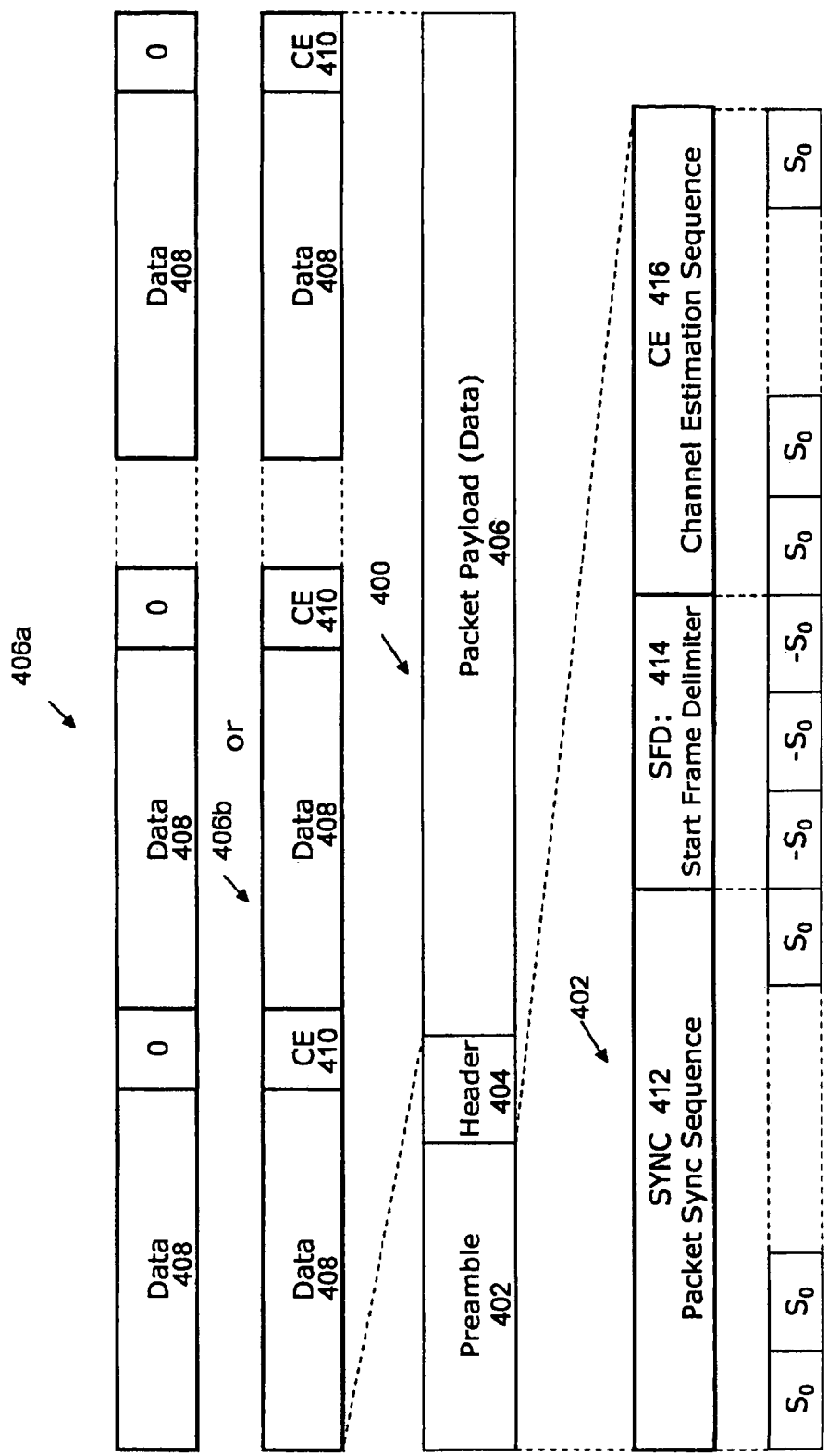
FIG. 4 is a diagram illustrating examples of a frame structure that can be used in a UWB system in accordance with one embodiment.

FIG. 4 is a diagram illustrating an example frame structure 400 that can be used for the downlink configured in accordance with one embodiment of the systems and methods described herein. Frame 400 comprises a preamble 402 separated from a packet payload, or data portion 406 by header 404. In the example of FIG. 4, data portion 406 can comprise various fields depending on the embodiment. In one example embodiment, data portion 406a can be included in frame 400. Data portion 406a comprises data field 408 separated by zeros as illustrated. Other embodiments, for example, can include a data portion 406b, however. Data portion 406b includes data fields 408 separated by channel estimation sequences (CE) 410.

In data portion 406a, zeroes are included in order to let nay multipath decay, before decoding the next data field 408. In data portion 406b, CEs 410 are included to improve channel estimation. In other words, a known pattern can be used for CE 410, which can then be used by a remote device for improved channel estimation.

As with frame 102, preamble 402 can comprise a SYNC field 412, and SFD field 414, and a CE field 416. Unlike frame 102, however, SYNC 412 can comprise the same sequence ($S_0$) repeated a certain number of times. SFD 414 can also be configured from the same sequence; however, the inverse of the sequence ($-S_0$) can be used as illustrated. CE 416 can also be constructed from the same sequence ($S_0$). In one embodiment, sequence ($S_0$) is an m-sequence, specifically an m-sequence of length 127. Even more specifically, maximum length, or m-sequences can be selected that form a connected set of sequences, which means that the sequences selected exhibit very low cross correlation and almost perfect autocorrelation.

As explained in co-pending U.S. patent application Ser. No. 11/425,964 entitled "Systems And Methods For Generating a Common Preamble For Use In a Wireless Communication System," filed Jun. 22, 2006, and which is incorporated herein by reference as if set forth in full, the use of m-sequences with perfect autocorrelation and low cross-correlation can be used to limit interference between piconets.

For example, in embodiments that used m-sequences of length 127, it can be shown that there are 6 sequences that meet the requirements for a connected set described herein. In other words, it can be shown that there are 6 m-sequences of length 127 that have the lowest possible cross-correlation, in this case about 17. As a result, each of these 6 sequences can be assigned to a different piconets, which enables systems that include 6 piconets operating within overlapping range of each other.

Figure 5:
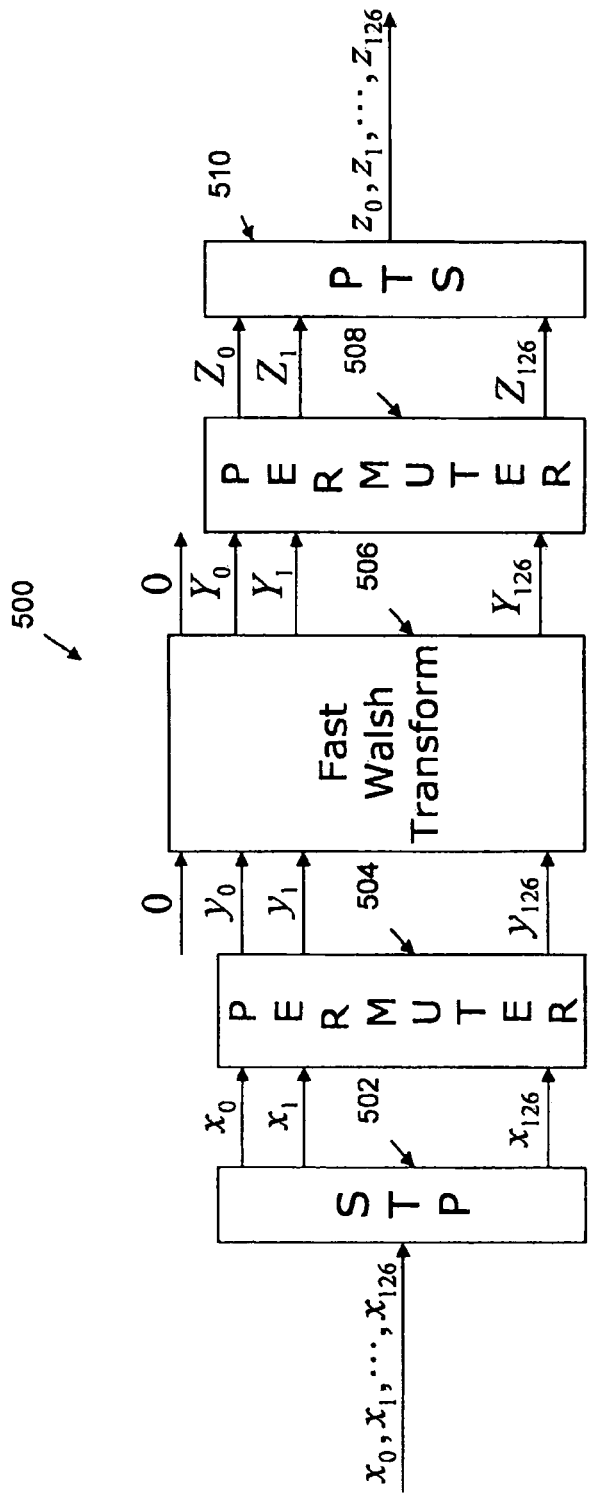
FIG. 5 is a diagram illustrating an example code matched filter that can be implemented in a UWB system that used the frame structure of FIG. 4 in accordance with one embodiment.

Moreover, use of 8 matched set of m-sequences in the manner described and illustrated in FIG. 4 allows the use of a very efficient code match filter design. FIG. 5 is a diagram illustrating an example code match filter 500 configured in accordance with the systems and methods described herein. As can be seen, code match filter 500 can be configured to receive a serial stream of data bits ($x_n$). The serial data can be input into a serial-to-parallel converter 502, which can be configured to convert the serial data into a parallel data as illustrated. As result, the data can be processed at a much lower speed than derail data stream ($x_n$). This reduces the complexity and processing overhead required.

The parallel data can then be passed to a permuter 504 configured to permute the parallel data, which can then be passed to a fast Walsh transform block 506. Each parallel data stream will have its own permutation. The data is permuted so that it can be process via a fast Walsh transform. The output of fast Walsh transform block 506 can then be provided to permuter 508, which essentially undoes the permutation performed by permuter 504. The output of permuter 508 can then be passed to a parallel-to-serial converter 510, which can be configured to convert the parallel data of the output of permuter 508 into a serial data as illustrated.

It should be noted that code match filter 500 can be implemented in a very low complexity design relative to conventional code match filters, such as those described above, which decreases cost, decreases size requirements, and can increase efficiency.

Figure 6:
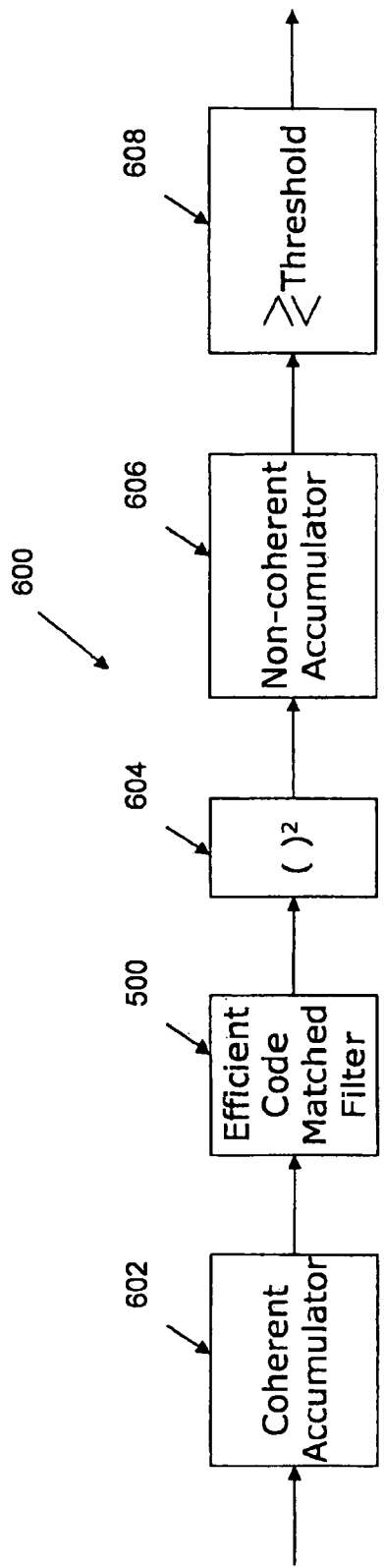
FIG. 6 is a diagram illustrating a portion of a receiver that can include the code matched filter of FIG. 5 in accordance with one embodiment.

FIG. 6 in the diagram of a receiver portion 600 configured to determine whether or not a receiver is synchronized with a piconets transmitting frames 400 that includes an efficient code match filter, such as code match filter 500, in accordance with one embodiment of the systems and methods described herein. Receiver portion 600 can include a coherent accumulator 602 configured to accumulate M periods of the m-sequence. For example, M can be equal to 4 and thus coherent accumulator can accumulate 4 periods of the m-sequence. By accumulating M periods of the m-sequence, the speed of the circuitry needed to process frame 400 can be reduced by a factor M. For example if M is equal to 4 then the processing speed required of the circuitry can be reduced from, e.g., 1.5 GHz to 0.375 GHz. In addition, interference is reduced, and noise rejection is increased, by the same factor, e.g., 4.

The output of coherent accumulator 602 can then be passed to efficient code match filter 500, the output or which can be passed to squarer 604, then non-coherent accumulator 606, and finally decision block 608, which can be configured to compare the output of non-coherent accumulator 606 with the threshold in order to determine whether signals from the piconets are present.

Accordingly, implementation of portion 600 can greatly reduce overhead by reducing the processing speed at which portion 600 must operate. Further, interference is greatly reduced due to the use of the m-sequences and the noise rejection provided by accumulating m periods of the m-sequences.

In certain embodiments, spreading can also be implemented in order to increase the range and interference rejection at the expense of decreasing the data rate. For example, in one embodiment, the data can be spread by a factor of 2, e.g., with a BPSK code. This means that there will be 1 bit for every two chips. In other embodiments, the spreading factor can be 4, 8, and so on depending on the requirement of a particular embodiment.

The spreading is achieved by coding each bit of data with multiple chips. For example, if the spreading factor is 2, then a 2 chip code is used to spread each data bit. If the spreading factor is 4; then a 4 chip code is used to spread each data bit. It can be preferable to select and implement the spreading codes so as to ensure that the maximum possible transmit power can be achieved. It will be understood that when a code is used to spread, the spectrum will not be flat. Thus, the output power may need to be reduced based on the I-CC regulations. Proper selecting and implementation of the spreading codes can, however, counter act this.

Figure 7:
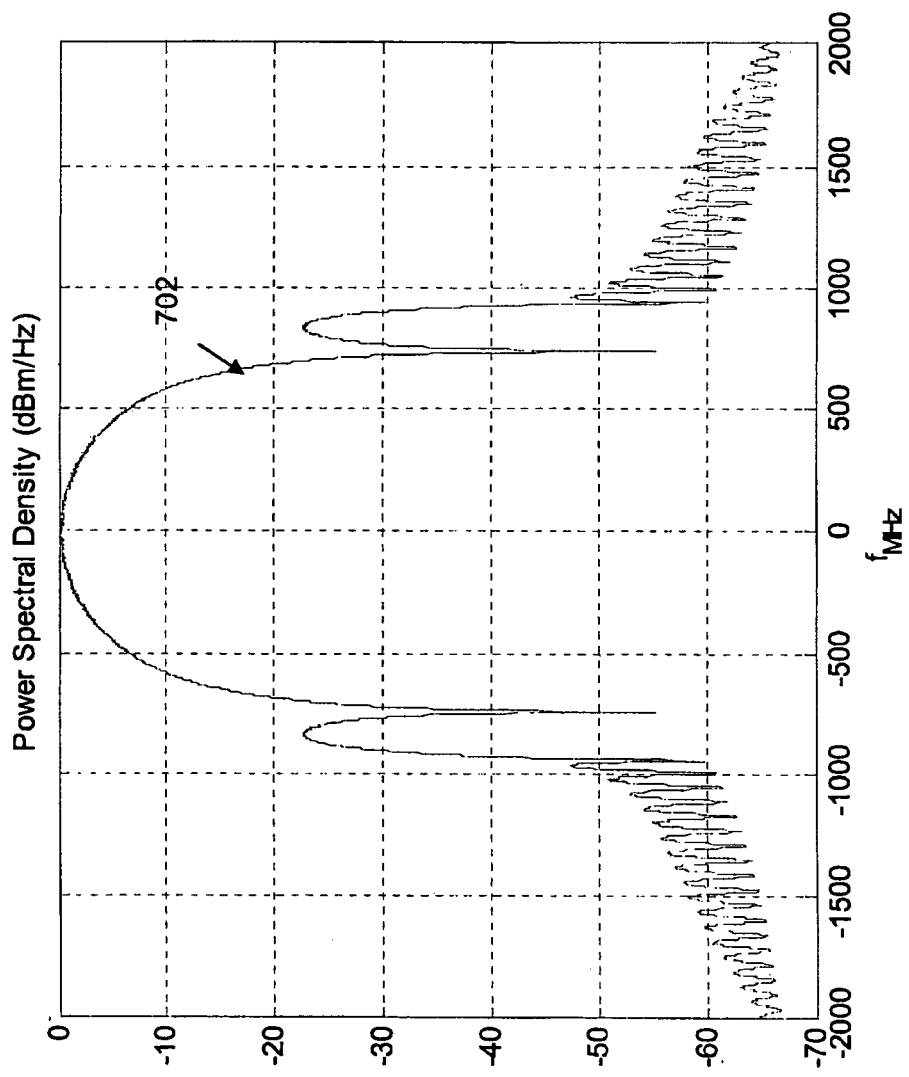
FIG. 7 is a diagram illustrating the spectrum produced when data is spread using the code [1,1]
Figure 8:
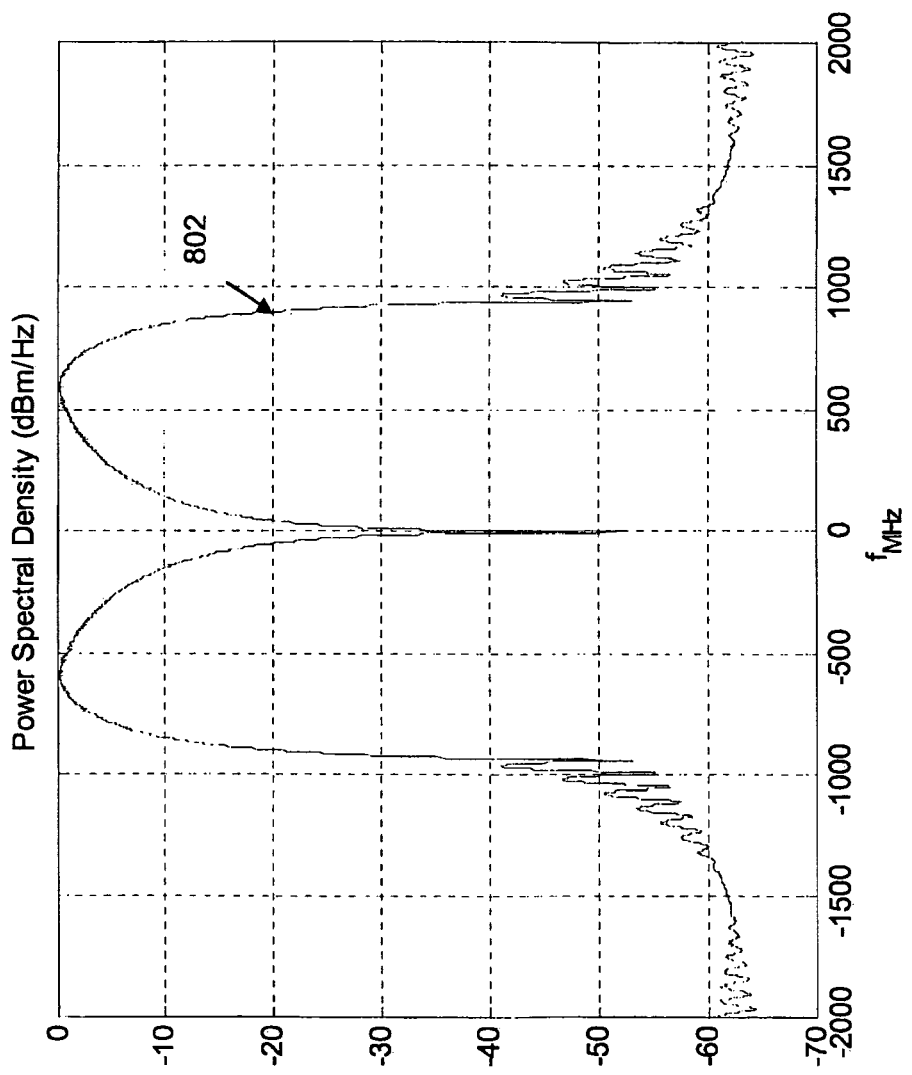
FIG. 8 is a diagram illustrating the spectrum produced when data is spread using the code [1,−1]

For example, in the case of a spreading factor of 2, two spreading codes can be used, i.e., (1,1) or (1, -1). When spreading with a code of (1, 1), the spectrum will not be flat, and consequently the power at the transmitter has to be reduced in order to meet the FCC requirement imposed on the spectrum within a UWB system. FIG. 7 is a diagram illustrating the spectrum 702 that results when a code of (1,1) is used. Similarly, when a code of (1, -1) is used a non-flat spectrum is produced. FIG. 8 is a diagram of the spectrum 802 that is produced when a code of (1, -1) is used. In each case the transmitter must be backed off by 3.3 dB, which reduces the range and at least partially defeats the purpose of using spreading codes in the first place.

Figure 9:
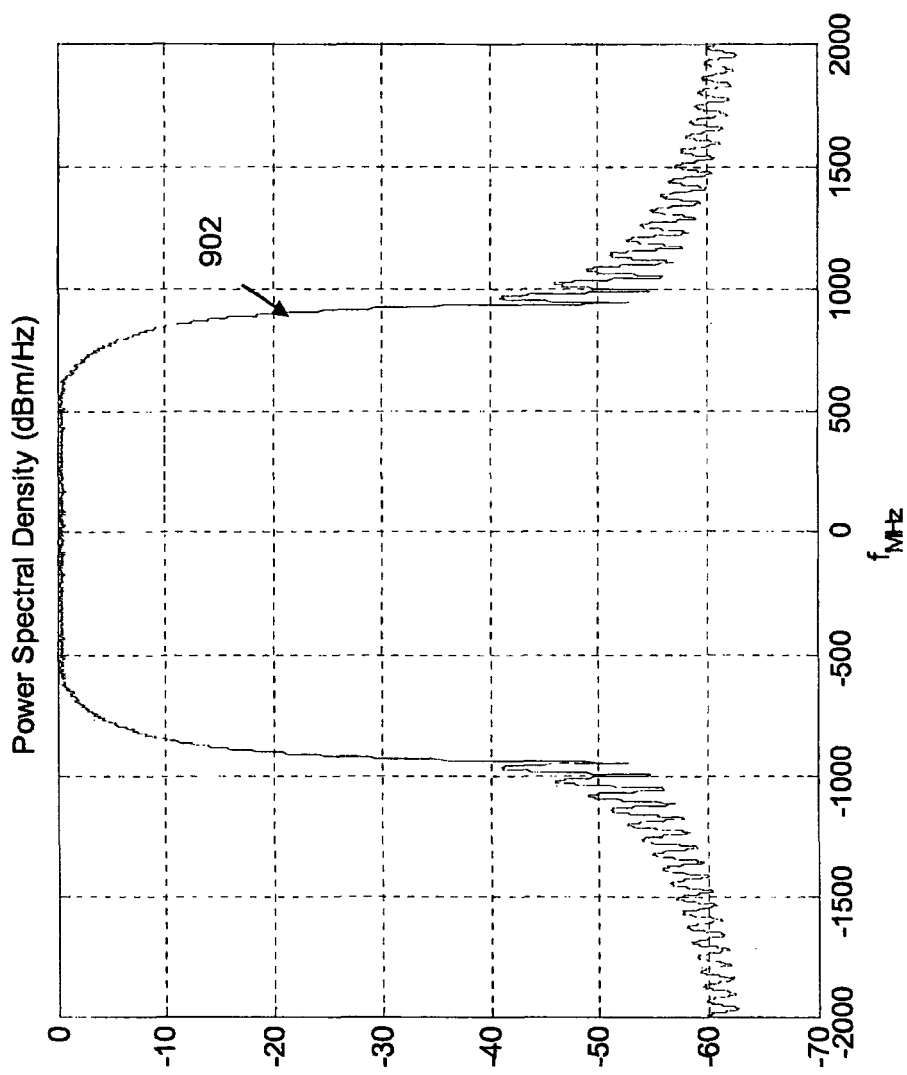
FIG. 9 is a diagram illustrating the spectrum produced when the codes [1,1] and [1,−1] are used in combination to spread data in accordance with one embodiment.

In the systems and methods described herein, alternating codes can be used to spread the data within data fields 408. For example, the even numbered fields 408, i.e., fields 0, 2, 4, etc., can be spread using the sequence (1,1), while odd numbered fields. i.e., 1, 3, 5, etc., are spread using the sequence (1, -1). The even data fields 408 will then exhibit spectrum similar to that illustrated in FIG. 7 while odd data fields 408 will exhibit a spectrum similar to that illustrated in FIG. 8; however, the over all spectrum for data field 406 within the frame 400 will be a flat spectrum, such as spectrum 902 illustrated in FIG. 9. As a result, the power in the transmitter requires minimal reduction and better interference rejection can be achieved. For example, in one embodiment the transmitter needs to be backed off by only 0.4 dB.

Again, guard intervals of no transmitted data, or CE field 410 can be included between data field 408. In embodiments that use a CE field 410, the need to track the channel can be eliminated, since CE field 410 can be used to re-acquire the channel before each data field 408 is processed, which can lead to even greater efficiency.

It will be understood that similar techniques can be used for spreading factors of 4, 8, etc., in order to achieve a flatter spectrum.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A device, comprising:
   a frame generator configured to generate a frame of data, the frame of data comprising a plurality of data fields; and
   a spreader configured to spread the data fields using a plurality of codes, the codes selected so that the combined spectrum for the spread data fields is substantially flat.

2. The device of claim 1, wherein the codes are [1,1] and [1,−1].

3. The device of claim 1, wherein the data fields are separated by a channel estimation pattern.

4. The device of claim 1, wherein the data fields are separated by zeroes.

5. The device of claim 1, wherein the frame comprises a preamble, the preamble comprises a sync field, and the sync field comprises another plurality of codes selected from a method set of m-sequences.

6. A method implemented in a device, comprising:
   generating, by the device, a frame of data comprising a plurality of data fields; and
   spreading, by the device, the data fields using a plurality of codes, the codes being selected so that the combined spectrum for the spread data fields is substantially flat.

7. The method of claim 6, wherein the codes are [1,1] and [1,×1].

8. The method of claim 6, wherein the data fields are separated by a channel estimation pattern.

9. The method of claim 6, wherein the data fields are separated by zeroes.

10. The method of claim 6, wherein the frame comprises a preamble, the preamble comprises a sync field, and the sync field comprises another plurality of codes selected from a method set of m-sequences.

11. An access point, comprising:
    a frame generator configured to generate a frame of data, the frame of data comprising a plurality of data fields;
    a spreader configured to spread the data fields using a plurality of codes, the codes selected so that the combined spectrum for the spread data fields is substantially flat; and
    a circuit configured to transmit the frame of data with the spread data fields.

12. A device, comprising:
    means for generating a frame of data comprising a plurality of data fields; and
    means for spreading the data fields using a plurality of codes, the codes being selected so that the combined spectrum for the spread data fields is substantially flat.

13. The device of claim 12, wherein the codes are [1,1] and [1,×1].

14. The device of claim 12, wherein the data fields are separated by a channel estimation pattern.

15. The device of claim 12, wherein the data fields are separated by zeroes.

16. The device of claim 12, wherein the frame comprises a preamble, the preamble comprises a sync field, and the sync field comprises another plurality of codes selected from a method set of m-sequences.

* * * * *